(12) United States Patent
Molenhouse et al.

(10) Patent No.: US 12,483,013 B2
(45) Date of Patent: Nov. 25, 2025

(54) HIGH VOLTAGE CABLE CLEAT

(71) Applicant: Panduit Corp., Tinley Park, IL (US)

(72) Inventors: Nicholas M. Molenhouse, New Lenox, IL (US); Joseph D. Cicero, Mount Prospect, IL (US); Christopher Bentley, Darlington (GB); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/657,861

(22) Filed: May 8, 2024

(65) Prior Publication Data

US 2025/0350104 A1    Nov. 13, 2025

(51) Int. Cl.
  H02G 3/04    (2006.01)
  F16B 2/04    (2006.01)
  F16B 2/16    (2006.01)
  F16L 3/10    (2006.01)

(52) U.S. Cl.
  CPC .......... H02G 3/0456 (2013.01); F16L 3/1091 (2013.01); *F16B 2/04* (2013.01); *F16B 2/16* (2013.01)

(58) Field of Classification Search
  CPC .... F16B 2/16; F16B 2/02; F16B 2/204; F16B 2/06; H02G 3/0456; F16L 3/1091
  USPC ... 248/53, 65, 68.1, 69, 73, 74.1, 74.2, 74.4, 248/74.5, 229.1, 229.14, 2, 29.15, 229.2, 248/229.24, 229.25, 230.6, 230.5, 231.71, 248/231.6, 1, 316.7, 316.6
  See application file for complete search history.

(56) References Cited

U.S. PATENT DOCUMENTS

| | | | |
|---|---|---|---|
| 2,355,742 A | | 8/1944 | Morehouse |
| 5,943,830 A | * | 8/1999 | Truitt ..................... E04G 21/26 |
| | | | 254/133 A |
| 6,079,673 A | | 6/2000 | Cox |
| 6,109,561 A | | 8/2000 | Haines |
| 8,398,033 B2 | | 3/2013 | Booth |

(Continued)

FOREIGN PATENT DOCUMENTS

| | | |
|---|---|---|
| AT | 14217 U1 | 6/2015 |
| CN | 103162016 A | 6/2013 |

(Continued)

OTHER PUBLICATIONS

Ellis Patents, Ltd., Cable Guide Clamp Data Sheet, Oct. 18, 2022, 2 pgs.

(Continued)

*Primary Examiner* — Alfred J Wujciak
(74) *Attorney, Agent, or Firm* — Peter S. Lee; Christopher S. Clancy; James H. Williams

(57) ABSTRACT

A high voltage cable cleat that facilitates cable installation and secures cable configurations. The high voltage cable cleat includes a bottom cleat and a top cleat. The bottom cleat has an outer surface, a first end, a second end, and an inner surface. The inner surface has a cable support area with a plurality of pockets. Each pocket houses a ball transfer with a ball extending above the cable support area of the inner surface to guide cables positioned on the bottom cleat. The top cleat has an outer surface, a first end, a second end, and an inner surface. The top cleat is installed over the bottom cleat and secured to the bottom cleat by fasteners.

9 Claims, 9 Drawing Sheets

(56) References Cited

U.S. PATENT DOCUMENTS

| | | | |
|---|---|---|---|
| 8,827,216 B2 * | 9/2014 | Brown | F16M 13/04 |
| | | | 248/229.23 |
| 9,080,698 B2 | 7/2015 | Fukumoto | |
| 9,106,069 B2 | 8/2015 | Frizzell | |
| 9,353,892 B2 | 5/2016 | Frizzell | |
| 9,404,605 B2 | 8/2016 | Booth et al. | |
| 9,551,438 B2 | 1/2017 | Frizzell | |
| 9,601,241 B2 | 3/2017 | Dannenberg | |
| 10,094,491 B1 | 10/2018 | Crouse et al. | |
| 10,411,452 B2 | 9/2019 | Varale | |
| 11,165,230 B1 | 11/2021 | Jordan et al. | |
| 11,532,929 B2 | 12/2022 | Robinson et al. | |
| 11,802,637 B2 | 10/2023 | Koenig et al. | |
| 2008/0291778 A1 * | 11/2008 | Faucheaux, Jr. | G01V 1/201 |
| | | | 367/16 |
| 2014/0374546 A1 * | 12/2014 | Borch-Jensen | H02G 3/0475 |
| | | | 29/428 |
| 2019/0145549 A1 * | 5/2019 | Gerardo | F16L 3/1075 |
| | | | 248/65 |
| 2019/0379186 A1 | 12/2019 | Chitti Babu et al. | |
| 2021/0184445 A1 | 6/2021 | Frizzell et al. | |
| 2023/0335981 A1 | 10/2023 | Robinson et al. | |

FOREIGN PATENT DOCUMENTS

| | | |
|---|---|---|
| CN | 107221908 A | 9/2017 |
| CN | 112332340 A | 2/2021 |
| CN | 219980402 U | 11/2023 |
| EP | 1973211 B1 | 5/2011 |
| EP | 2806198 B1 | 11/2018 |
| EP | 3588708 A1 | 1/2020 |
| GB | 2210402 B1 | 2/1992 |
| GB | 2318109 A | 4/1998 |
| GB | 2361029 B | 6/2003 |
| GB | 2389970 B | 5/2005 |
| GB | 2405900 B | 7/2006 |
| GB | 2514384 B | 6/2017 |
| GB | 2574840 B | 7/2020 |
| GB | 2604373 A | 7/2022 |
| GB | 2585846 B | 8/2023 |
| JP | 2014138517 A | 7/2014 |
| WO | 2013040237 A1 | 3/2013 |
| WO | 2020001969 A1 | 1/2020 |

OTHER PUBLICATIONS

Panduit Corp., High Voltage Cable Clamp Product Bulletin, Oct., 2023, 2 pgs.

* cited by examiner

HIGH VOLTAGE CABLE CLEAT

FIELD OF THE INVENTION

The present invention relates to a cable cleat, and more particularly to a high voltage cleat with ball transfers for installing cables.

BACKGROUND OF THE INVENTION

The world is rapidly moving toward renewable energy sources, and the current electrical infrastructure will not be able to sustain the massive demands for more electricity. Efforts are increasingly being made worldwide to meet these new demands. A significant portion of the upgrades going forward will be carried out using large underground high voltage cables.

The installation of high voltage cables is an extensive, difficult process due to the sheer size and weight of the cables. Trenches are dug leading to the entry of tunnels. Large spools of cable are placed at the start of the trench and large rollers are placed throughout the trench. The cable is spooled out and pulled by heavy machinery along the rollers. Once the cables have reached entry, they are either pulled alongside of the installed cable cleats lining the tunnel (see FIG. 1) and lifted into the cleats via heavy machinery or pulled through the cleats, using external rollers placed ahead of time. In both methods, the cable cleat tops are removed, and then replaced once the cable is in position. Once the top portion of the cleat is bolted, the cable is secured and protected against a potential short circuit fault. Massive weight and therefore friction between the cleats and cable make the latter portion of the installation arduous. The process of removing and replacing the top cleats adds additional time to the process.

Current high voltage cable cleats are available in various configurations, materials, and sizes. Most cable cleats include two pieces, a top cleat and a bottom cleat secured together around the cable with one or two bolts. Current cable cleats fail to offer any assistance in improving the movement of cables through the cleats during installation. The current installation process requires extra equipment such as rollers, or machinery specific to tunnel projects to guide and assist in pulling the cable through. The extra machinery adds complications as well. The use of rollers adds to the cost and difficulty as well since the rollers take time to set up and will regularly need to be maintained or replaced. The added difficulty of using rollers also proves to be time consuming.

It would be desirable to provide a cleat for high voltage applications capable of being used in a submerged installation. It would also be desirable to provide an improved cable cleat that facilitates the installation of cables.

SUMMARY OF THE INVENTION

The present invention is directed to a high voltage cable cleat used to facilitate installation and secure cables. The high voltage cable cleat includes a bottom cleat and a top cleat. The bottom cleat has an outer surface, a first end, a second end, and an inner surface. The inner surface of the bottom cleat has a cable support area with a plurality of pockets. Each pocket houses a ball transfer. The ball transfer has a ball extending above the cable support area of the inner surface to guide cables positioned on the bottom cleat. The top cleat has an outer surface, a first end, a second end, and an inner surface. The top cleat is installed over the bottom cleat and secured to the bottom cleat by fasteners.

DETAILED DESCRIPTION

Figure 1:
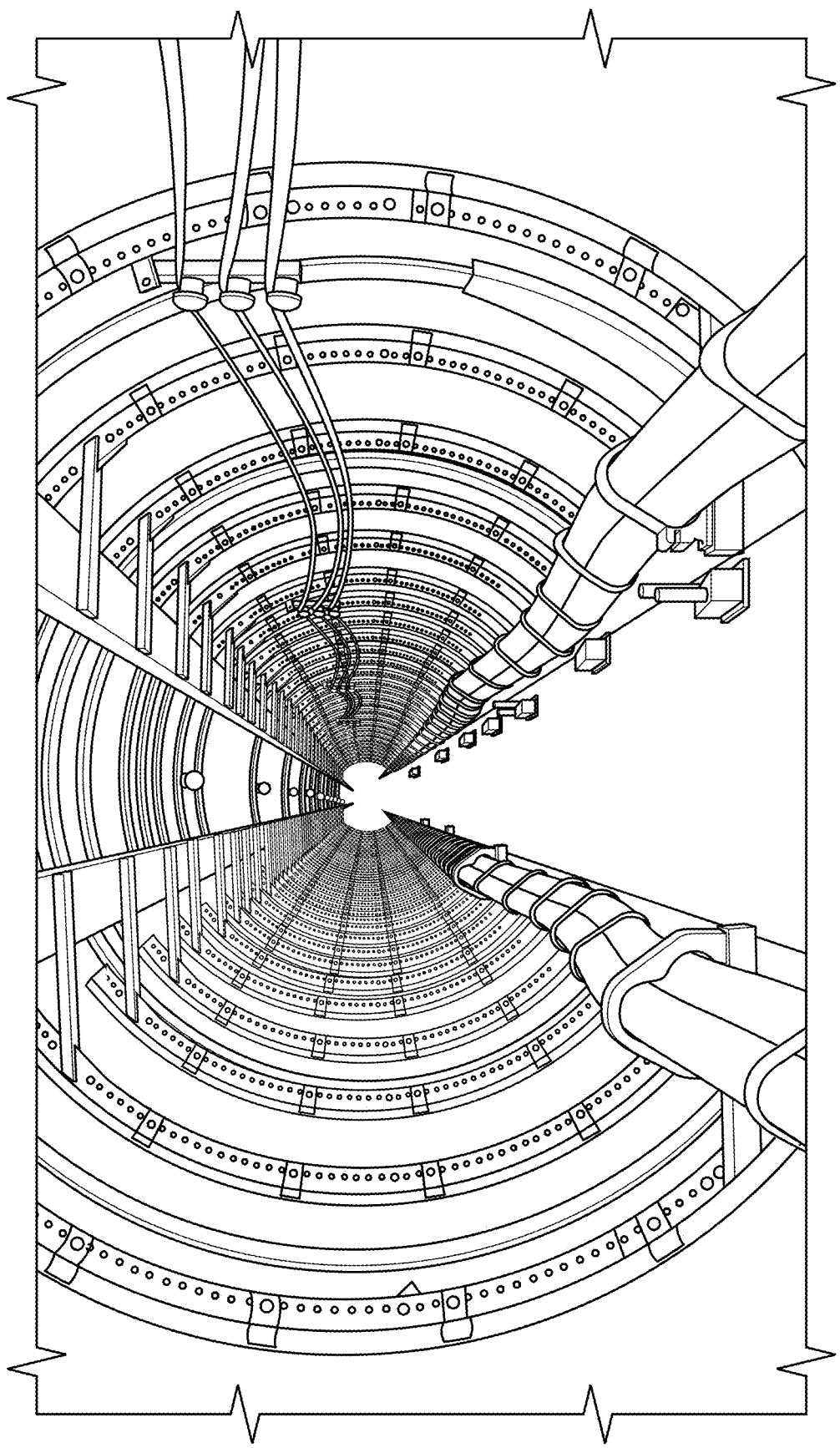
FIG. 1 is a perspective view of prior art cleats for a trefoil cable configuration aligned and installed in a tunnel.
Figure 2:
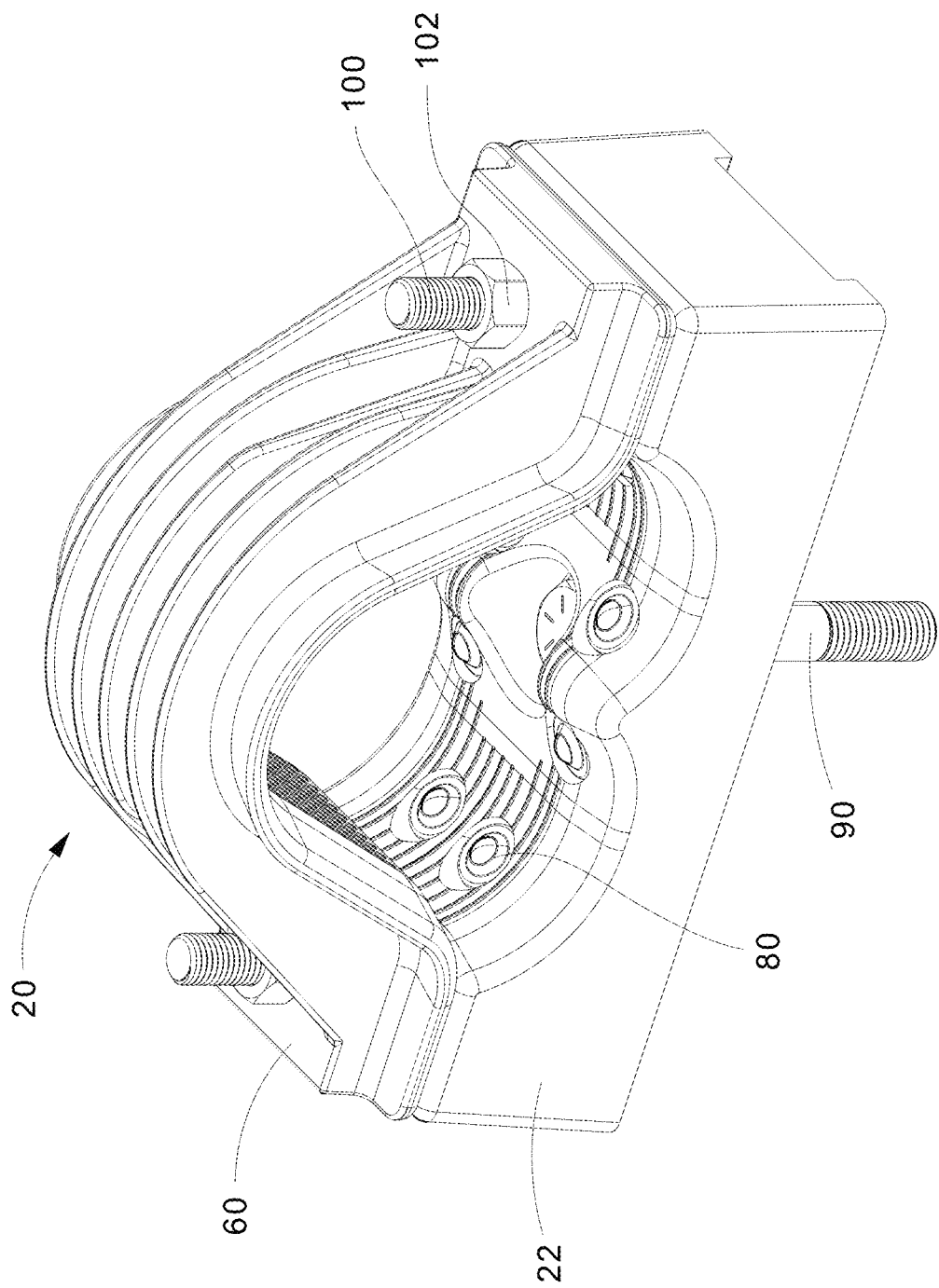
FIG. 2 is a perspective view of the high voltage cable cleat of the present invention.
Figure 3:
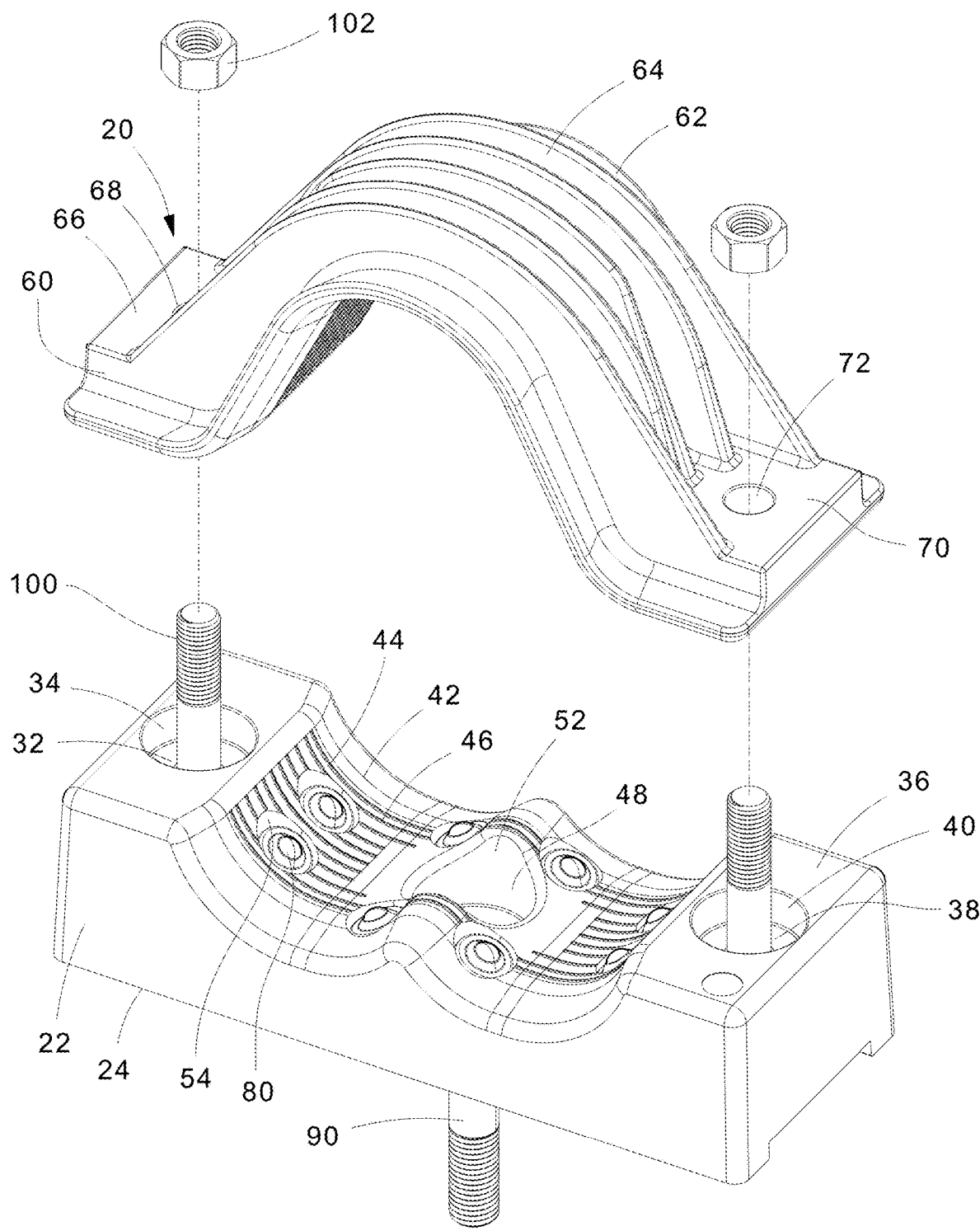
FIG. 3 is a partially exploded view of the high voltage cable cleat of FIG. 2.
Figure 4A:
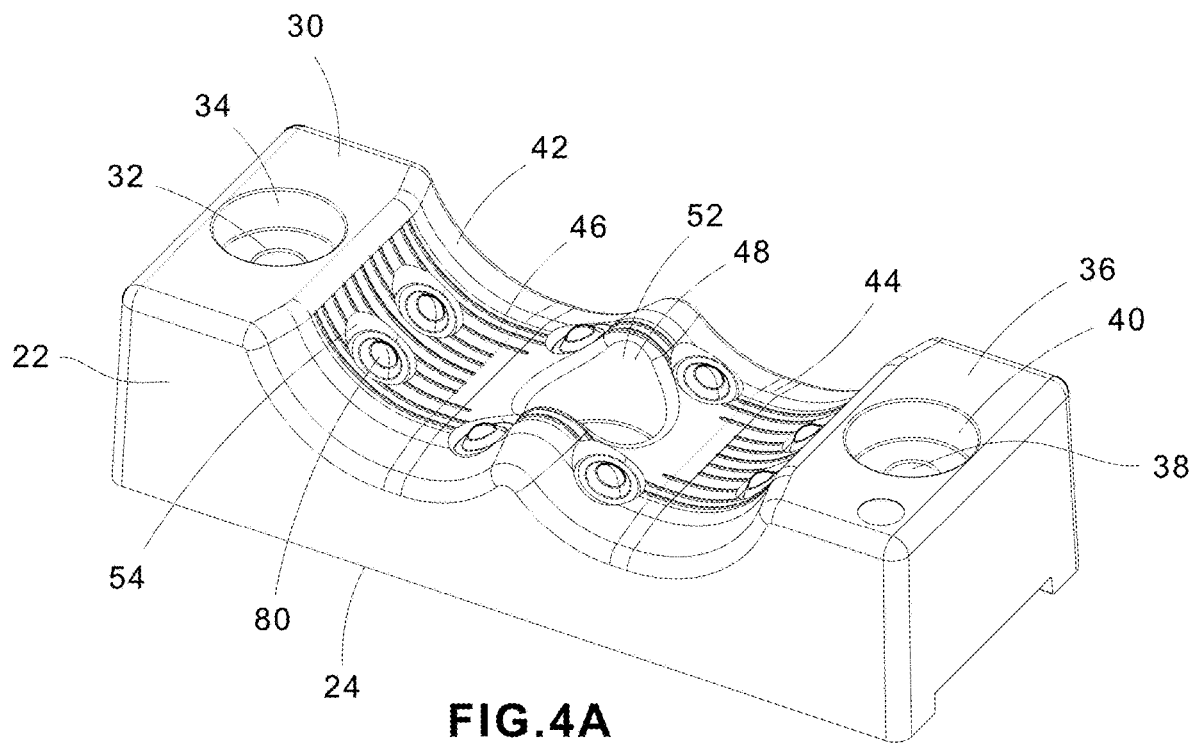
FIG. 4A is a perspective view of the bottom cleat of FIG. 2.
Figure 4B:
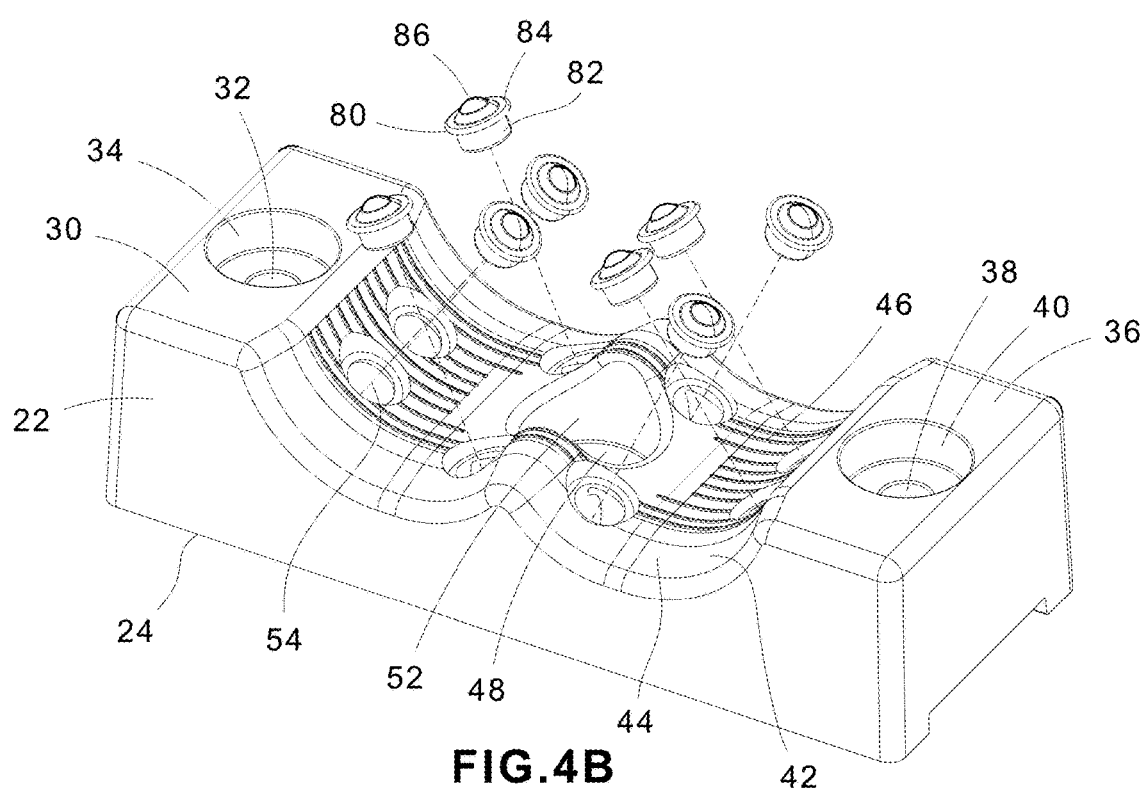
FIG. 4B is an exploded view of the ball transfers and the bottom cleat of FIG. 4A.
Figure 7:
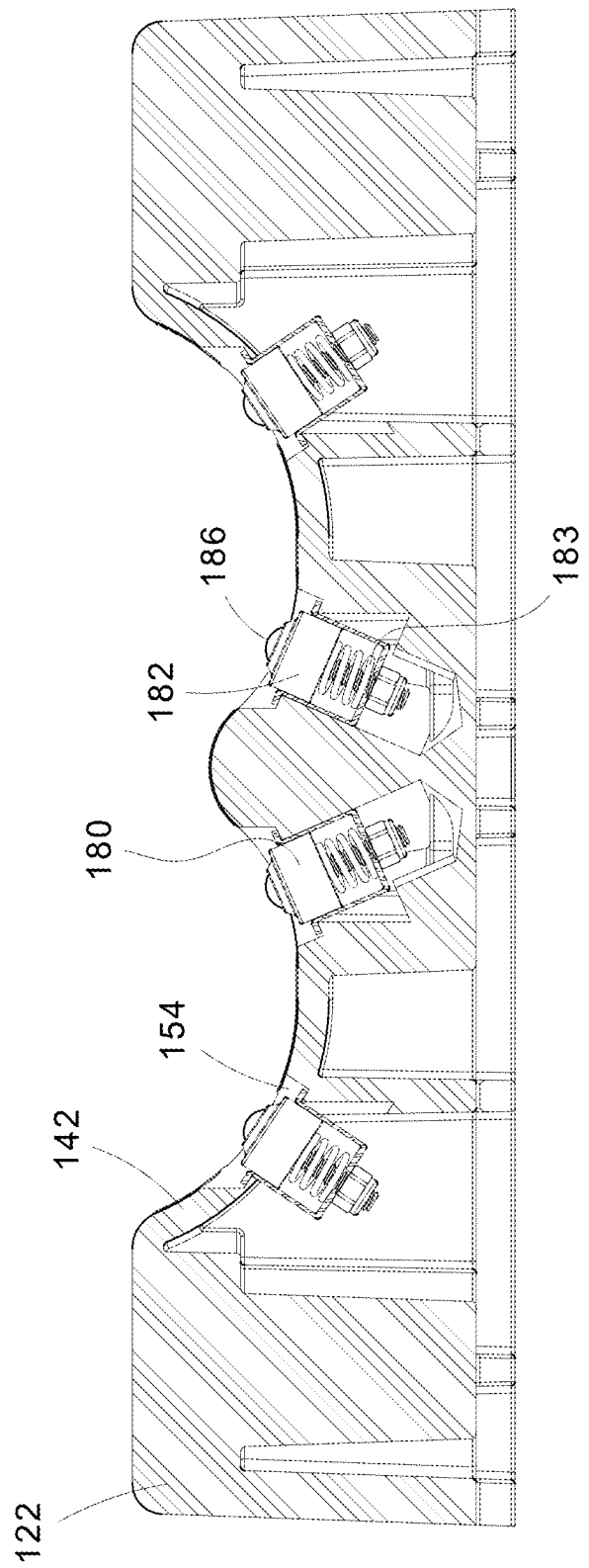
FIG. 7 is a cross sectional view of the bottom cleat of FIG. 6 with the alternative spring loaded ball transfers positioned in the bottom cleat.

FIGS. 2 and 3 illustrate the high voltage cable cleat 20 of the present invention. The high voltage cable cleat 20 includes a bottom cleat 22 and a top cleat 60 secured to the bottom cleat 22 by fasteners 100 and nuts 102. The top cleat 60 includes an outer surface 62, a first end 66, a second end 70, and an inner surface 74. The first end 66 and the second end 70 include a mounting hole 68, 72, respectively, for receiving a fastener 100 to secure the top cleat 66 to the bottom cleat 22. The outer surface 62 of the top cleat 60 includes a plurality of strengthening ribs 64 for providing support to the top cleat 60. The inner surface 74 of the top cleat includes a plurality of gripping ribs 76 for engaging the trefoil cable configuration 200 installed in the cable cleat 20 as seen in FIG. 7.

The bottom cleat 22 of the high voltage cable cleat 20 includes an outer surface 24, a first end 30, a second end 36, and an inner surface 42. The first end 30 and the second end 36 include a mounting hole 32, 38 and a recessed pocket 34, 40, respectively. The mounting holes 32, 38 at the ends 30, 36 of the bottom cleat 22 align with the mounting holes 68, 72 at the ends 60, 70 of the top cleat 60 when the top cleat 60 is installed over the bottom cleat 22. The mounting holes 32, 38 at the ends 30, 36 of the bottom cleat 22 receive a fastener 100 from beneath the bottom cleat 22 such that the fastener 100 extends upwards through the mounting holes 32, 38 in the ends 30, 36 of the bottom cleat 22 and through the mounting holes 68, 72 in the ends 66, 70 of the top cleat 60 when the top cleat 60 is positioned over the bottom cleat 22.

The center 48 of the bottom cleat 22 also includes a mounting hole 50 and a recessed pocket 52. A fastener 90 is installed from the top of the bottom cleat 22 through the mounting hole 50 to secure the cable cleat 22 to a surface. The recessed pocket 52 houses the head of the fastener 90 to prevent the fastener 90 from occupying space along the inner surface 42 of the bottom cleat 22 and to prevent the fastener 90 from interfering with the cable configuration 200 installed on the bottom cleat 22.

The inner surface 42 of the bottom cleat 22 includes a curved cable support area 44 with a plurality of gripping ribs 46. The gripping ribs 46 engage the cable configuration 200 when positioned on the bottom cleat 22. The curved cable support area 44 also includes a number of pockets 54 designed to receive ball transfers 80. The ball transfers 80 include a cylindrical housing 82, an outer rim 84, and a ball 86. The ball 86 is positioned in the center of the cylindrical housing 82 and is surrounded by the outer rim 84.

As illustrated in FIGS. 4A-4B and 5A-5C, one ball transfer 80 is positioned within each pocket 54. The ball transfer 80 is press fit into the pocket 54.

Figure 5A:
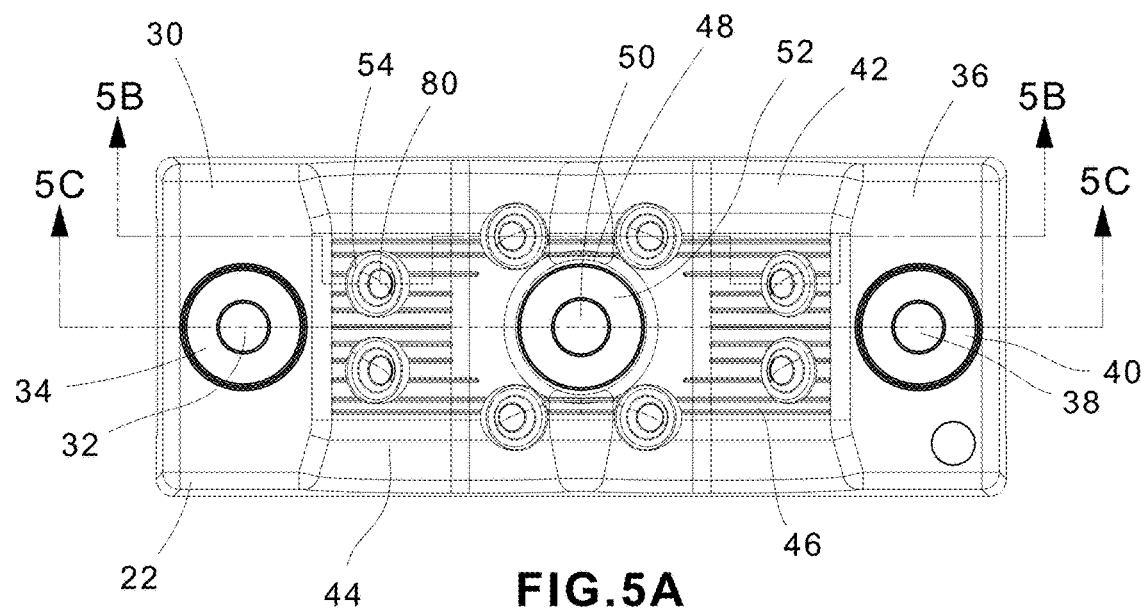
FIG. 5A is a top view of the bottom cleat of FIG. 4A.
Figure 5B:
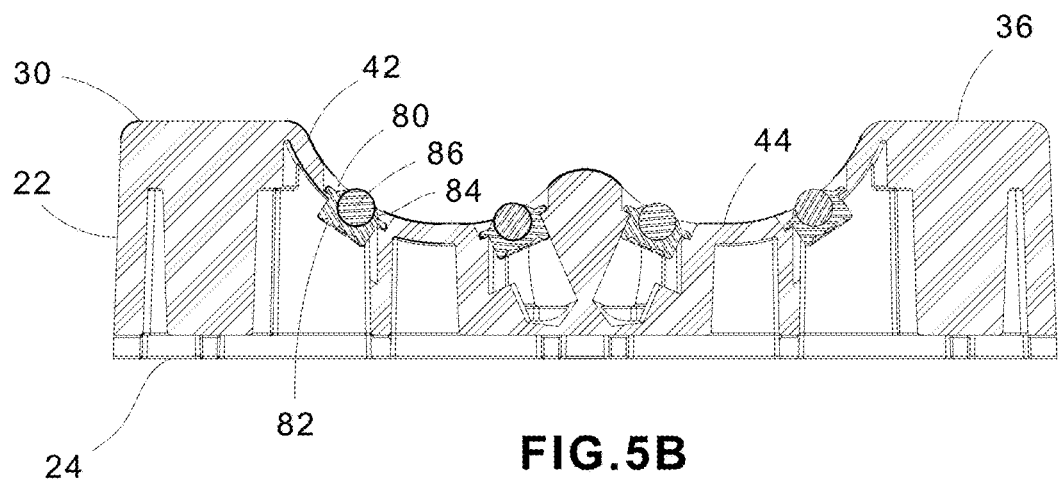
FIG. 5B is a cross sectional view taken along the line 5B-5B of the bottom cleat of FIG. 5A.
Figure 5C:
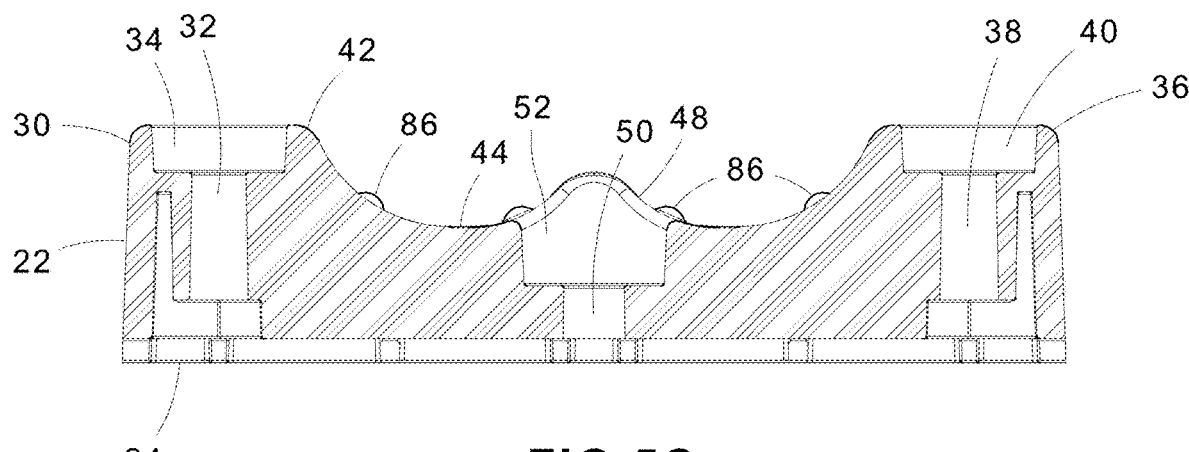
FIG. 5C is a cross sectional view taken along the line 5C-5C of the bottom cleat of FIG. 5A.

As illustrated in FIGS. 5B and 5C, the ball 86 of the ball transfer 80 extends upwardly into the curved cable support area 44. As described below, the ball transfers 80 facilitate the installation of cables in the high voltage cable cleat 20. The ball transfers 80 greatly reduce the friction during installation making it easier to install the cables on the high voltage cable cleats 20.

Alternatively, it is also contemplated that the ball transfer 80 may include threads and the pocket may include threaded holes to enable the ball transfer to be threadedly secured in the pocket.

Figure 6:
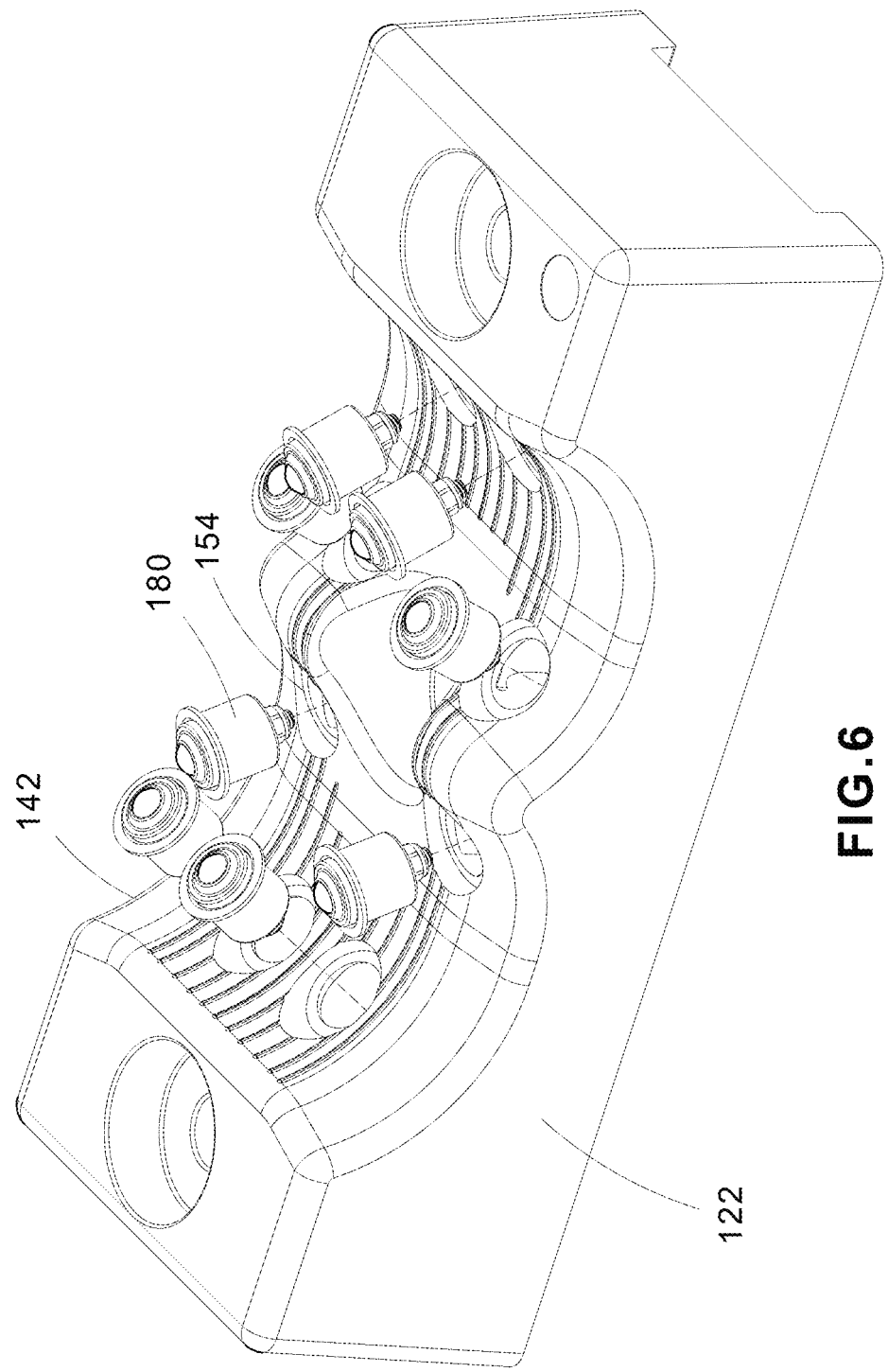
FIG. 6 is an exploded view of an alternative spring loaded ball transfer and a bottom cleat.

FIGS. 6 and 7 illustrate an alternative spring loaded ball transfer 180. The bottom cleat 122 includes an inner surface 142 with a plurality of pockets 154. The spring loaded ball transfers 180 are housed in the pockets 154. The spring loaded ball transfers 180 include a housing 182, a spring 183, and a ball 186. A top cleat can be installed over the bottom cleat and the cables positioned thereon, as described below. The spring loaded ball transfer allows the ball transfer to be enabled during cable installation but disabled after cables have been installed on the bottom cleat.

Figure 8:
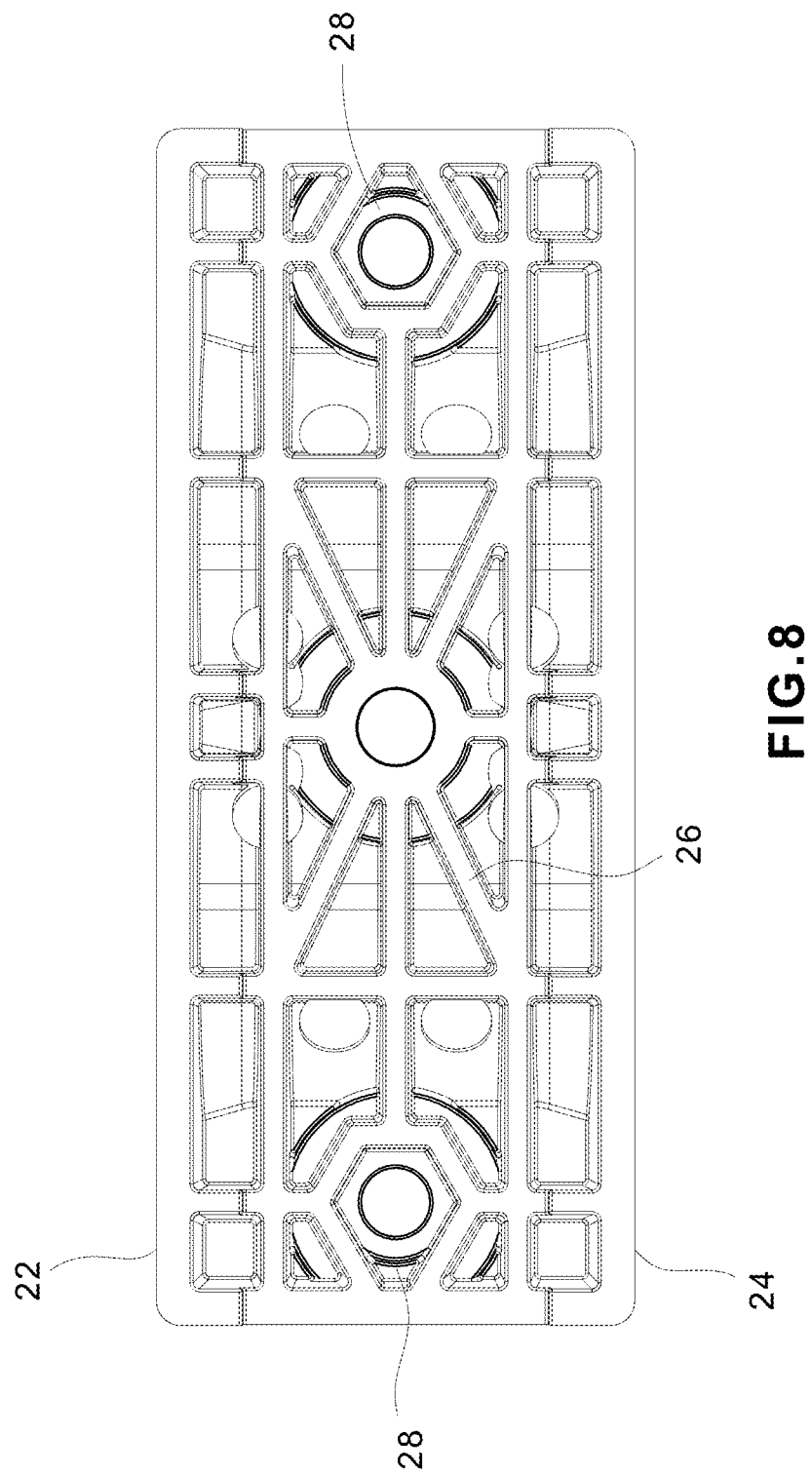
FIG. 8 is a bottom view of the bottom cleat of FIG. 4A.

As illustrated in FIG. 8, the outer surface 24 of the bottom cleat 22 includes a plurality of strengthening ribs 26 to provide support for the bottom cleat 22. The bottom cleat 22 also includes hex pockets 28 at the first end 30 and the second end 36 for facilitating the installation of the fasteners 100 into the mounting holes 32, 38, respectively.

To install the cables 200 in the high voltage cable cleats 20, the bottom cleats 22 are first installed to the site of installation via mounting fasteners 90 in the center 48 of the bottom cleats 22. Once the bottom cleats 22 are installed, a pulling rope is laced through the high voltage cable cleats 20. A cable sock is then attached to one end of the cable to be pulled. The rope is tied to the cable sock enabling the cable to be pulled through the bottom cleats 22 with the rope. The cables glide over the ball transfers 80 in the bottom cleats 22 to assist the installation of cables on the bottom cleats 22. Once the cables are in place, the top cleat 60 will be positioned over the cables placed in a trefoil configuration, however other cable configurations such as single, double, or quad are contemplated. The top cleat 60 is secured to the bottom cleat 22 by fasteners 100 at the ends 66, 70 of the top cleat 60 and the ends 30, 36 of the bottom cleat 22. Bolting the top cleat 60 to the bottom cleat 22 provides enough pressure to compress the ball transfers 80 down thereby further securing the cables.

Figure 9:
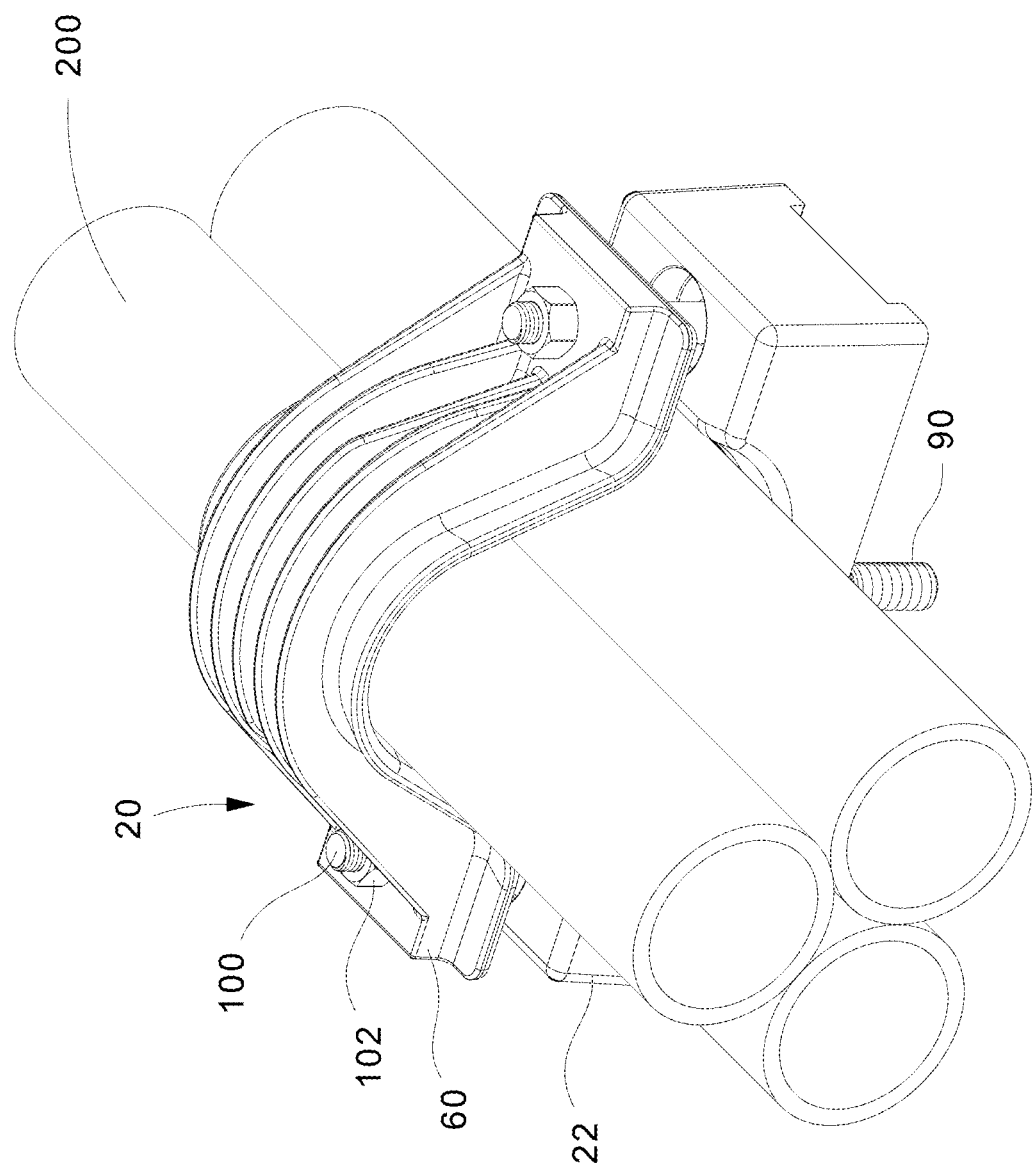
FIG. 9 is a perspective view of the high voltage cleat of FIG. 2 with a trefoil cable configuration installed thereon.

FIG. 9 illustrates the high voltage cable cleat 20 of the present invention with a trefoil cable configuration 200 installed therein.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A high voltage cable cleat for securing cables, the high voltage cable cleat comprising:
   a bottom cleat with an outer surface, a first end, a second end, and an inner surface, wherein the inner surface has a cable support area with a plurality of pockets, each pocket houses a ball transfer with a ball extending above the cable support area of the inner surface for guiding cables positioned on the bottom cleat; and
   a top cleat installed over the bottom cleat, wherein the top cleat has an outer surface, a first end, a second end, and an inner surface; whereby the top cleat is secured to the bottom cleat by fasteners.

2. The high voltage cable cleat of claim 1, wherein the ball transfer has a cylindrical housing with an outer rim, the ball is positioned within the cylindrical housing and extends above the outer rim.

3. The high voltage cable cleat of claim 1, wherein the ball transfers are spring loaded.

4. The high voltage cable cleat of claim 1, wherein the outer surface of the bottom cleat includes strengthening ribs for providing support for the bottom cleat.

5. The high voltage cable cleat of claim 1, wherein the outer surface of the top cleat includes strengthening ribs for providing support for the top cleat.

6. The high voltage cable cleat of claim 1, wherein the inner surface of the bottom cleat includes gripping ribs for engaging cables position in the cable cleat.

7. The high voltage cable cleat of claim 1, wherein the inner surface of the top cleat includes gripping ribs for engaging cables position in the cable cleat.

8. The high voltage cable cleat of claim 1, wherein the first and second ends of the bottom cleat include a recessed pocket with a mounting hole for receiving a fastener.

9. The high voltage cable cleat of claim 1, wherein a center of the bottom cleat includes a recessed pocket with a mounting hole for receiving a fastener.

* * * * *